United States Patent
Lewis

(10) Patent No.: US 7,298,179 B2
(45) Date of Patent: Nov. 20, 2007

(54) DIGITAL CLOCK SWITCHING MEANS

(75) Inventor: Michael Lewis, Märsta (SE)

(73) Assignee: Infineon Technologies AG, Munich (DE)

( * ) Notice: Subject to any disclaimer, the term of this patent is extended or adjusted under 35 U.S.C. 154(b) by 51 days.

(21) Appl. No.: 11/386,916

(22) Filed: Mar. 22, 2006

(65) Prior Publication Data

US 2006/0224911 A1 Oct. 5, 2006

(30) Foreign Application Priority Data

Mar. 22, 2005 (EP) .................................. 05006295

(51) Int. Cl.
*G06F 1/08* (2006.01)
(52) U.S. Cl. .......................................... 327/34; 327/99
(58) Field of Classification Search .................. 327/34, 327/99, 407
See application file for complete search history.

(56) References Cited

U.S. PATENT DOCUMENTS

| | | | |
|---|---|---|---|
| 5,574,753 A | 11/1996 | Vartti et al. | |
| 6,831,959 B1 | 12/2004 | Manchester | |
| 6,882,206 B2 * | 4/2005 | Lawler et al. | ............... 327/291 |
| 7,023,944 B2 * | 4/2006 | Gau | ........................... 375/373 |

2004/0164782 A1    8/2004 Zampetti et al.

FOREIGN PATENT DOCUMENTS

| | | |
|---|---|---|
| EP | 0 591 593 A1 | 4/1994 |
| EP | 0 841 834 A2 | 5/1998 |

* cited by examiner

*Primary Examiner*—Kenneth B. Wells
(74) *Attorney, Agent, or Firm*—Eschweiler & Associates, LLC

(57) ABSTRACT

A digital clock switching circuit and method is disclosed and is operable to deadlock-free switch a digital clock source for an integrated circuit. The circuit includes a first finite state machine associated with a first clock source and a second finite state machine associated with a second clock source. The finite state machines are connected to each other and monitor the current state of the other finite state machine. Each finite state machine receives an input select signal to control which clock source should be active and passed to a clock output. Each finite state machine includes a counter, wherein the counter associated with the active clock source is initialized to a first predetermined value when the input select signal indicates a switching off of the active clock source. The finite state machine associated with the active clock source enters a CHECK state and varies a count at each clock cycle. If the other finite state machine verifies a presence of its clock source before the counter reaches a second predetermined value the switch of the active clock source is effected.

21 Claims, 9 Drawing Sheets

FIG 9
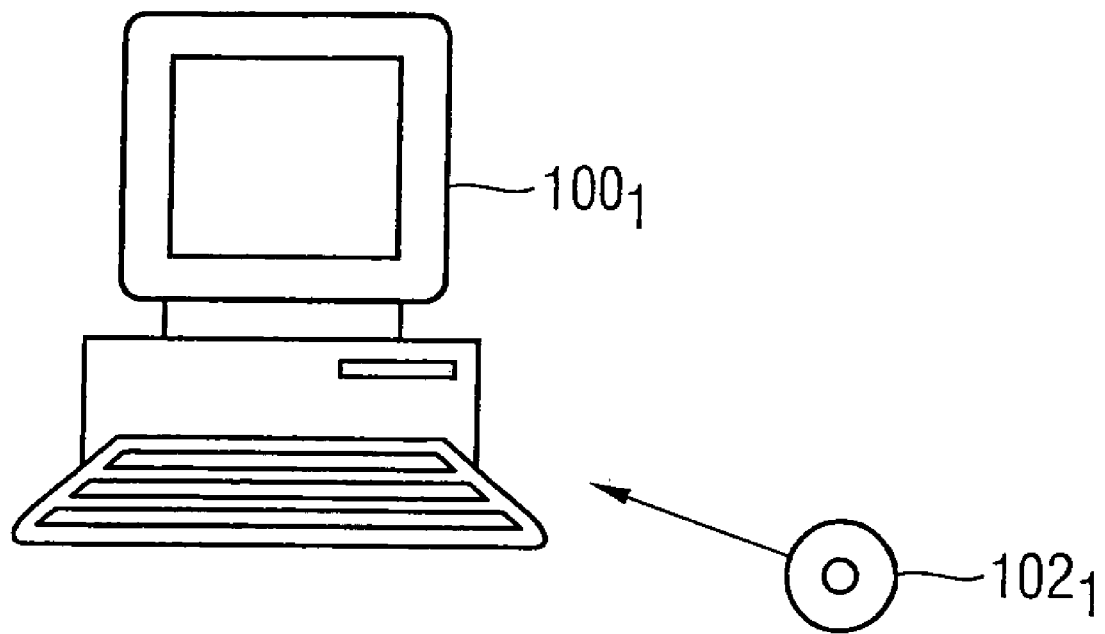
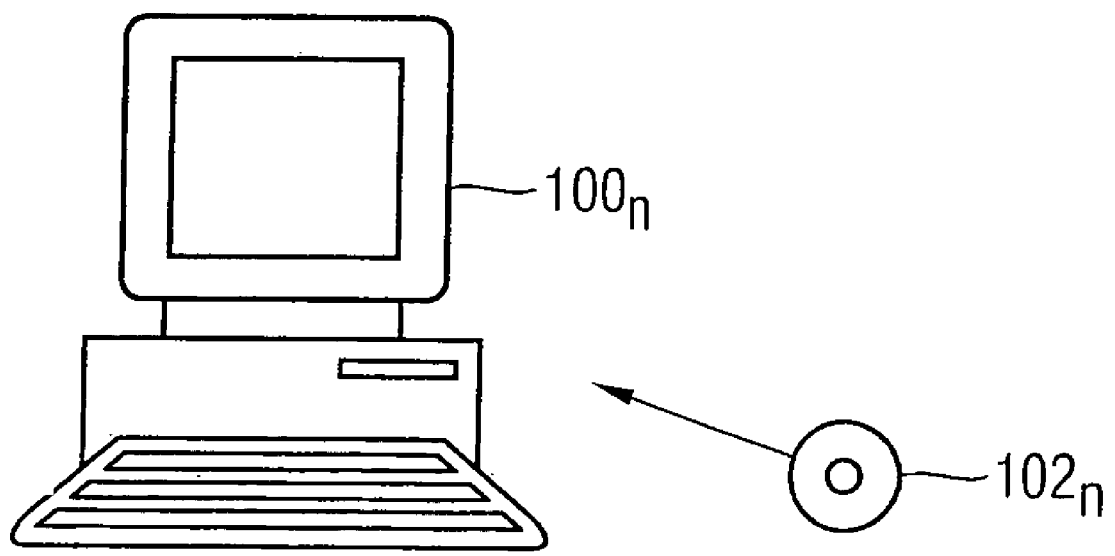

DIGITAL CLOCK SWITCHING MEANS

REFERENCE TO RELATED APPLICATIONS

This application claims the benefit of the priority date of European application 05 006 295.9, filed on Mar. 22, 2005, the contents of which are herein incorporated by reference in their entirety.

FIELD OF THE INVENTION

The present invention relates to a digital clock switching system operable to deadlock-free switch the source of a digital clock for an integrated circuit, and a method associated therewith.

BACKGROUND OF THE INVENTION

Most digital integrated circuits require a clock signal to synchronize their activity. Often, a circuit will be designed so that the clock signal can come from more than one source. For example, it may either be generated internally on the chip, or be supplied externally. The motivation for such a design is flexibility and reduced power consumption: in some applications, there could already be an externally generated clock available and so to generate another clock on-chip is wasteful of energy. In other applications, no such external clock may be available. Since it is extremely expensive to produce many different variants of an integrated circuit, common practice is to design a chip to meet both requirements.

For this to be possible, there must exist a circuit for changing the source of the digital clock. Such a change-over must be glitch free, i.e. it must be possible to guarantee that the clock seen by the digital system neither has very short pulses, nor very closely spaced clock pulses. Since the internal and external clocks are asynchronous to one another, this change-over needs to be performed with some care. Typically, it is ensured that the first clock signal is paused for a sufficient duration, before the second clock signal is allowed to take over.

A conventional circuit for performing this function is shown in FIG. 1. The circuit 50 consists of two finite state machines (FSMs) $52_1$, $52_2$ that are responsible for managing the switch-over. Each FSM $52_1$, $52_2$ is associated with a clock input, Clk_A or Clk_B. The FSMs $52_1$, $52_2$ change their state on the 1->0 transition of the relevant clock input. Each FSM $52_1$; $52_2$ has an output ClkEn which, when set to 1, causes the respective clock to be passed to the clock output Clk_Out. The input signal Select, assumed to be synchronous to Clk_Out, specifies which clock should be active. Each FSM $52_1$; $52_2$ monitors the state of the other clock enable signal via the input OtherClkEn. Since the input clocks are assumed to be asynchronous to one another, it is necessary to use a double latch synchronizer $54_1$, $54_2$ for the input signals which come from other clock domains.

The circuit 50 disclosed in FIG. 1 also comprises two second double latch synchronizers $56_1$, $56_2$ connected to the FSMs $52_1$, $52_2$ and having the signal (Select) as inputs. The circuit 50 also comprises two AND-gates $58_1$, $58_2$ connected to the FSMs $52_1$, $52_2$ and to the clock sources Clk_A, Clk_B. As is apparent from FIG. 1, the AND-gates. $58_1$, $58_2$ are also connected to an OR gate 60 which has an output in the form of the clock output, Clk_Out.

The function of the circuit 50 is best explained via the state diagram for the FSMs $52_1$, $52_2$, shown in FIG. 2. The FSMs $52_1$, $52_2$ differ only in their reset behavior and the polarity of the Select signal to which they respond. It is assumed that Clk_A is to be enabled at reset, and Select is zero. The variable A in the state diagram is set to '1' for the FSM $52_1$ associated with Clk_A and set to '0' for the FSM $52_2$ associated with Clk_B.

At reset, both FSMs $52_1$, $52_2$ begin in the RESET state. The upper FSM $52_1$ (A==1) proceeds into the ON state, asserts ClkEn and allows Clk_A to pass to Clk_Out. The lower FSM $52_2$ (A==0) proceeds into the OFF state.

At some point, the system desires to change its clock source and changes Select to '1'. The upper FSM $52_1$ observes the change, and proceeds to disable its clock by de-asserting ClkEn. Since the two FSMs $52_1$, $52_2$ are not synchronized, it is necessary for the lower FSM $52_2$ to ensure that the upper FSM $52_1$ has released the clock output. Therefore, on observing the change in Select, the lower FSM $52_2$ proceeds to the WAIT state. Only when it observes that the upper FSM $52_1$ has released the clock output (OtherClkEn==0) does it proceed to the ON state and allows the clock to pass.

The problem with the standard clock switch circuit 50 occurs when the clock to be switched to (for instance, Clk_B) is not present. This could be due to a misunderstanding about the application circuit, or due to a fabrication error of the integrated circuit. When the system requests to change the clock source, the upper FSM $52_1$ will disable the output clock. However, the lower FSM $52_2$ has no clock, and will never transition to the ON state. This causes a deadlock, since the system clock will not be restarted and so Select can not be changed. Such a deadlock is highly undesirable, as it means that the chip simply ceases to function with no diagnostic information and with no possibility to resume function in the alternative operating mode (using Clk_A).

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present one or more concepts of the invention in a simplified form as a prelude to the more detailed description that is presented later.

According to one embodiment of the invention, a digital clock switching circuit operable to deadlock-free switch the source of the digital clock for an integrated circuit is provided. The digital clock switching circuit comprises a first finite state machine associated with a first clock source, and a second finite state machine associated with a second clock source. The finite state machines are connected to each other and configured to monitor the current state of the other finite state machine. Each finite state machine is configured to receive an input signal (Select) operable to control which clock source should be active and passed to a clock output of the digital clock switching circuit.

In one embodiment, each finite state machine comprises a counter with a variable ($Cnt_1$; $Cnt_2$), wherein the counter associated with the active clock source will get its variable ($Cnt_1$; $Cnt_2$) initialized to a constant ($Nfail_1$, $Nfail_2$) when said input signal (Select) indicates the switching off of the active clock source, whereby the finite state machine associated with the active clock source enters a CHECK state, and wherein the respective counter decrements the variable ($Cnt_1$; $Cnt_2$) at each clock cycle. If the other finite state machine verifies the presence of its clock source before the variable ($Cnt_1$; $Cnt_2$) reaches zero, the switch of the active clock source will be effected. If, on the other hand, the variable ($Cnt_1$; $Cnt_2$) decrements to zero and no such verification has occurred, no switch of the active clock source will be effected. The main advantage with the digital clock switching circuit according to the invention is that it guarantees that the system never enters a deadlock state in the absence of one clock source.

In another embodiment a further advantage is achieved if each finite state machine has an output, a clock enable signal ($ClkEn_1$, $ClkEn_2$), each of which is a first input to a respective AND-gate, wherein each AND-gate has a second input that receives the respective clock source (Clk_A, Clk_B). The digital clock switching circuit also comprises a first OR-gate coupled to the output of each AND-gate and operable to output the clock output (Clk_Out) of the digital clock switching circuit.

Furthermore, it is an advantage in another embodiment if the clock enable signal ($Clk\_En_1$; $Clk\_En_2$) of each finite state machine is connected, via a first double latch synchronizer, to an input (Other $ClkEn_2$; Other $ClkEn_1$) of the other finite state machine, whereby each finite state machine is able to monitor the state of the other clock enable signal ($ClkEn_2$, $ClkEn_1$) via said input (Other $ClkEn_1$, Other $ClkEn_2$).

In still another embodiment, a further advantage is achieved if each finite state machine is connected to a second double latch synchronizer, whereby said input signal (Select) passes via said second double latch synchronizer.

In yet another embodiment, it is an advantage if the first clock source (Clk_A) is connected to and controls the first and second double latch synchronizers connected to the first finite state machine, and the second clock source (Clk_B) is connected to and controls the first and second double latch synchronizers connected to the second finite state machine.

In another embodiment a further advantage is achieved if the finite state machine is operable to disable the active clock source (Clk_A; Clk_B) before the other finite state machine verifies the presence of its clock source (Clk_B; Clk_A).

According to another embodiment, the finite state machine associated with the inactive clock source (Clk_B; Clk_A) is operable to verify the presence of its clock source (Clk_B; Clk_A) before the other finite state machine disables the active clock source (Clk_A; Clk_B).

In a further embodiment, the digital clock switching circuit also comprises a second OR-gate connected to an Error output ($Error_1$, $Error_2$) of each finite state machine. In such an embodiment, if the counter has decremented the variable ($Cnt_1$; $Cnt_2$) to zero, the finite state machine currently in the CHECK state is operable to enter an ERROR state, wherein the finite state machine is operable to re-enable the active clock source (Clk_A; Clk_B), which will be passed to the clock output (Clk_Out), and to issue an error signal to the second OR-gate.

In still another embodiment each finite state machine also comprises an output ($S_wOK_1$; $S_wOK_2$) and an input (Other $S_wOK_1$; Other $S_wOK_2$), wherein the output ($S_wOK_1$; $S_wOK_2$) of each finite state machine is connected, via a third double latch synchronizer, to the input (Other $S_wOK_2$; Other $S_wOK_1$) of the other finite state machine. In such embodiment, the first clock source (Clk_A) is connected to and is operable to control the third double latch synchronizer connected to the first finite state machine. Similarly, the second clock source (Clk_B) is connected to and is operable to control the third double latch synchronizer connected to the second finite state machine.

In another embodiment, if the finite state machine has its clock enable signal ($ClkEn_1$; $ClkEn_2$) active, and the input signal (Select) indicates the switching off of the active clock source (Clk_A; Clk_B), the finite state machine is operable to enter a CHECK state, wherein the active clock source (Clk_A; Clk_B) is disabled. Further, if the other finite state machine has its output ($S_wOK_2$; $S_wOK_1$) active before the counter has decremented the variable ($Cnt_1$; $Cnt_2$) to zero, and if the other finite state machine does not have its output ($S_wOK_2$; $S_wOK_1$) active before the counter has decremented the variable ($Cnt_1$; $Cnt_2$) to zero, the finite state machine is operable to enter the ERROR state and issue the error signal to the second OR-gate.

In addition, if the finite state machine has its clock enable signal ($ClkEn_1$; $ClkEn_2$) inactive, and the input signal (Select) indicates the switching on of its clock source (Clk_A; Clk_B), the finite state machine is operable to enter a WAIT state and its output ($S_wOK_1$; $S_wOK_2$) is operable to become active. In addition, when the other finite state machine has switched off its clock source (Clk_B; Clk_A), the other clock source (Clk_A; Clk_B) is operable to be active and passed to the clock output (Clk_Out).

The invention is also directed to a method for deadlock-free switching of the source of a digital clock for an integrated circuit. The method is performed with the aid of a first and a second clock source (Clk_A, Clk_B), wherein the first clock source (Clk_A) is active, and the second clock source (Clk_B) is inactive. The method comprises initializing a variable ($Cnt_1$) to a constant ($Nfail_1$, $Nfail_2$) when the switching off of the active clock source (Clk_A) is indicated, and decrementing the variable at each clock cycle. The method further comprises switching the active clock source (Clk_A) if the presence of the inactive clock source (Clk_B) is verified before the variable ($Cnt_1$) reaches zero. Alternatively, if the variable ($Cnt_1$) decrements to zero, no switch of the active clock source (Clk_A) is effected. The method of the invention advantageously guarantees that the system never enters a deadlock state in the absence of one clock source.

In one embodiment the method advantageously verifies the presence of the inactive clock source (Clk_B) before disabling the active clock source (Clk_A). In another embodiment, if the variable ($Cnt_1$) has decremented to zero, the active clock source (Clk_A) is re-enabled, and an error indication is issued.

In one embodiment, the method is performed with the aid of a digital clock switching circuit comprising a first finite state machine associated with the first clock source (Clk_A), and a second finite state machine associated with the second clock source (Clk_B). Each finite state machine has an input signal (Select) operable to control which clock source (Clk_A; Clk_B) should be active and passed to a clock output (Clk_Out) of the digital clock switching circuit. In addition, each finite state machine comprises a counter with a variable ($Cnt_1$; $Cnt_2$). In such context the method also comprises entering a CHECK state with the finite state machine associated with the active clock source (Clk_A) when the input signal (Select) indicates the switching off of the active clock source (Clk_A).

In yet another embodiment, if each finite state machine has an output, clock enable signal ($ClkEn_1$, $ClkEn_2$) which is connected, via a first double latch synchronizer, to an input (Other $ClkEn_2$; Other $ClkEn_1$) of the other finite state machine, the method also comprises each finite state machine monitoring the state of the other clock enable signal ($ClkEn_2$, $ClkEn_1$).

Further, if each finite state machine also comprises an output ($S_wOK_1$; $S_wOK_2$) and an input (Other $S_wOK_1$; Other $S_wOK_2$), the method also comprises entering a CHECK state with the finite state machine if the finite state machine has its clock enable signal ($ClkEn_1$,$ClkEn_2$) active, and the input signal (Select) indicates the switching off of the active clock source (Clk_A; Clk_B). The method further comprises disabling the active clock source (Clk_A; Clk_B) if the other finite state machine has its output ($S_wOK_2$; $S_wOK_1$) active before the counter means has decremented the variable ($Cnt_1$; $Cnt_2$) to zero. In addition, the other finite state machine does not have its output ($S_wOK_2$; $S_wOK_1$) active before the counter has decremented the variable ($Cnt_1$; $Cnt_2$) to zero, the finite state machine enters the ERROR state, and an error signal is issued.

In another embodiment, the method comprises entering a WAIT state with the finite state machine and activating its output if the finite state machine has its clock enable signal ($ClkEn_1$; $ClkEn_2$) inactive, and the input signal (Select) indicates the switching on of the clock source (Clk_A; Clk_B). In addition, the method comprises activating the other clock source and passing it to the clock output when the other finite state machine has switched off its clock source (Clk_B; Clk_A).

Another embodiment of the invention comprises at least one computer program product for deadlock-free switching of the source of the digital clock for an integrated circuit. The computer program product(s) is/are directly loadable into the internal memory of at least one computer digital, and comprises software code portions for performing the method according to the invention, when the at least one product is/are run on the at least one computer.

It should be emphasized that the term "comprises/comprising" when used in this specification is taken to specify the presence of stated features, steps or components but does not preclude the presence of one or more other features, integers, steps, components or groups thereof.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Embodiments of the invention will now be described with a reference to the accompanying drawings, in which:

FIG. 9 is a schematic diagram of some computer program products $102_1$, ..., $102_2$ according to the invention.

DETAILED DESCRIPTION OF THE INVENTION

Figure 1:
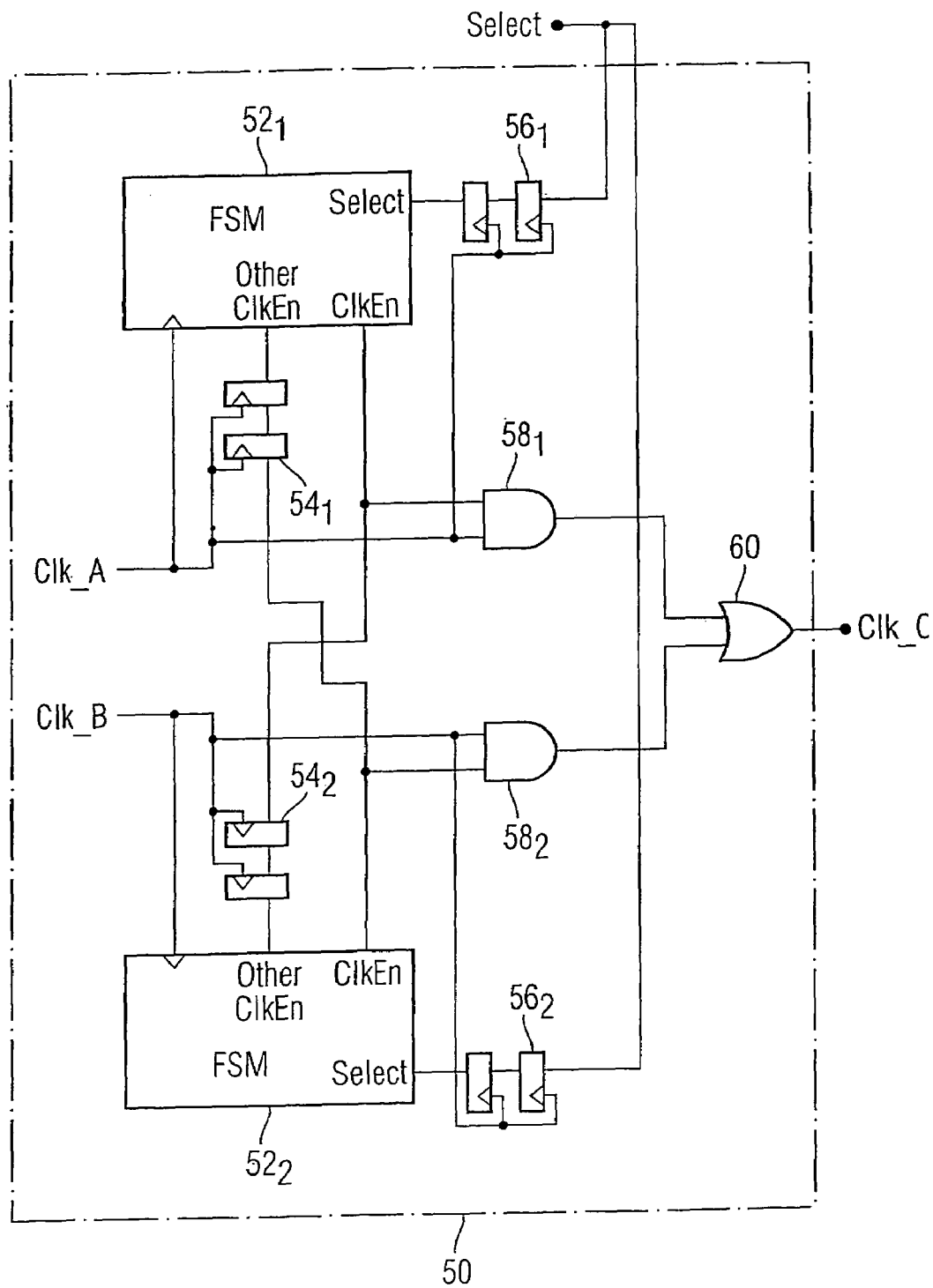
FIG. 1 is a block diagram of a known circuit 50 for glitch free clock source switch over.
Figure 2:
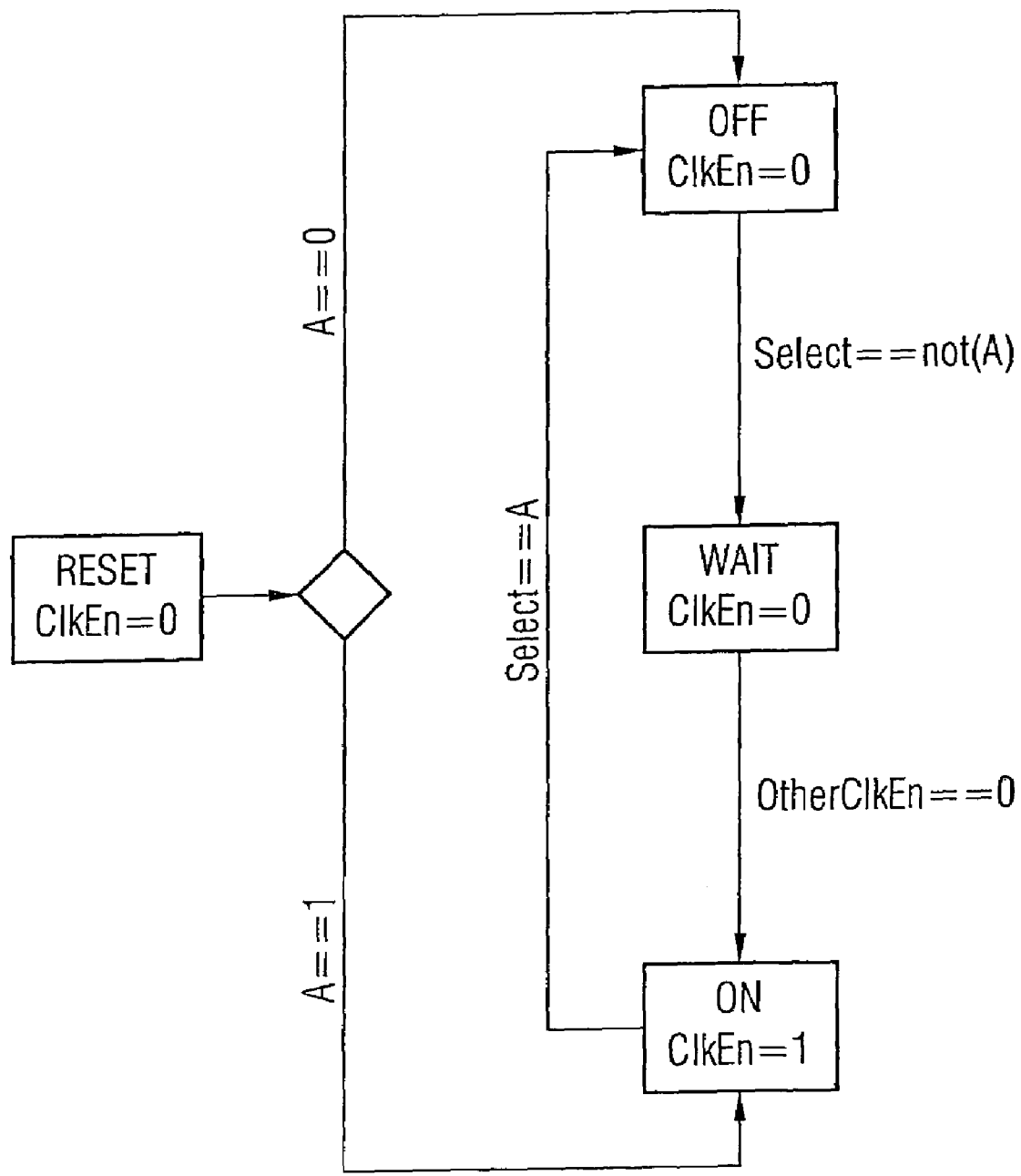
FIG. 2 is a state diagram for the finite state machines $52_1$, $52_2$ comprised in the circuit 50 disclosed in FIG. 1, in order to explain the function of the circuit 50.
Figure 3:
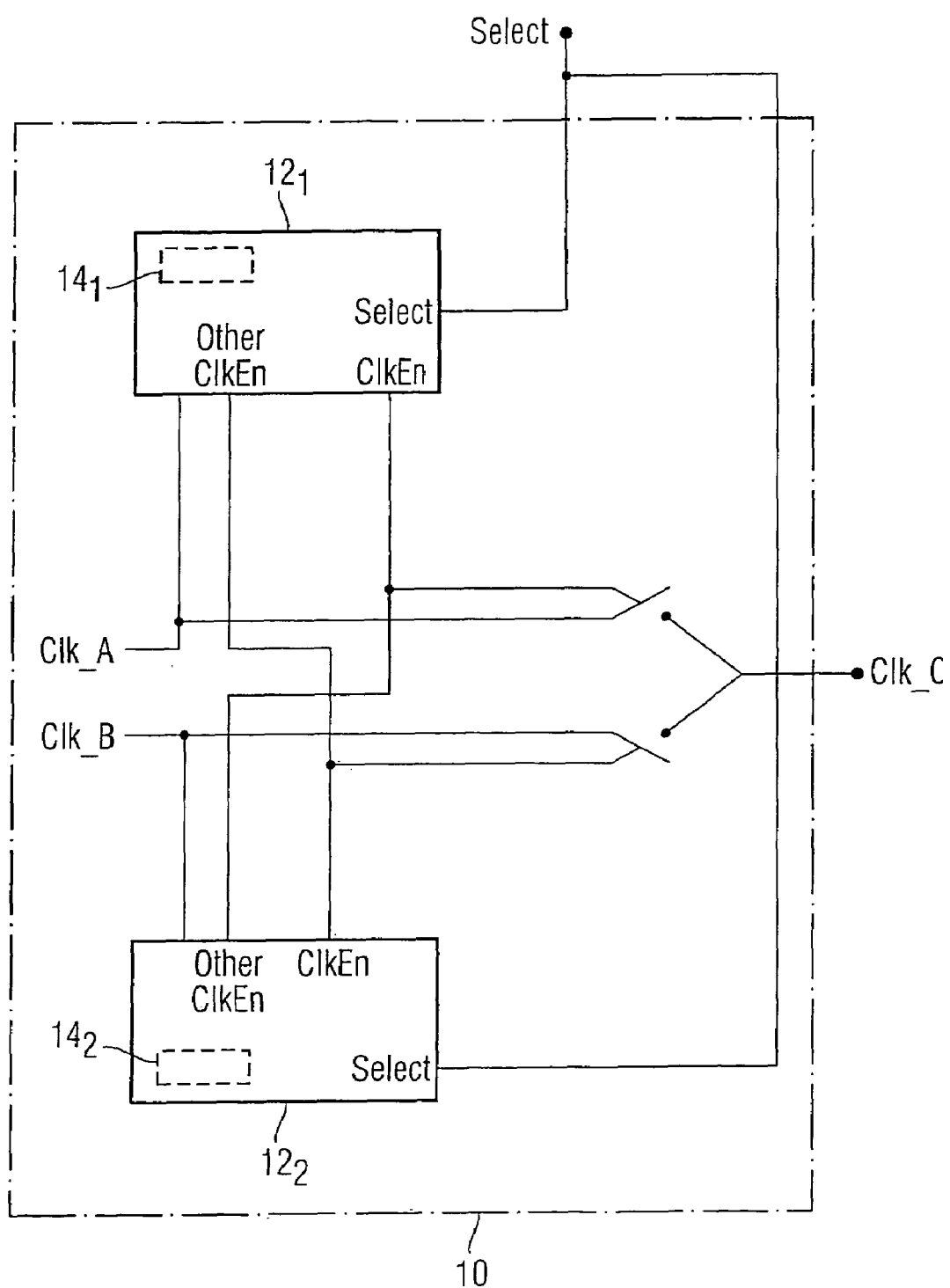
FIG. 3 is a block diagram of an embodiment of a digital clock switching circuit 10 operable to deadlock-free switch the source of the digital clock for an integrated circuit according to the invention.

In FIG. 3 there is disclosed a block diagram of one embodiment of a digital clock switching circuit 10 according to the present invention. The digital clock switching circuit 10 is operable to deadlock-free switch the source of the digital clock for an integrated circuit. The digital clock switching circuit 10 comprises a first finite state machine $12_1$ associated with a first clock source Clk_A, and a second finite state machine $12_2$ associated with a second clock source Clk_B. As is apparent from FIG. 3, the finite state machines $12_1$, $12_2$ are connected to each other, via the signals $ClkEn_1$, $ClkEn_2$, Other $ClkEn_1$, Other $ClkEn_2$, in order to monitor the current state of the other finite state machine $12_2$, $12_1$, respectively. Each finite state machine $12_1$, $12_2$ has an input signal (Select) operable to control which clock source Clk_A;Clk_B that should be active and passed to a clock output Clk_Out of the digital clock switching circuit 10. Each finite state machine $12_1$, $12_2$ comprises a counter $14_1$, $14_2$ with a count variable ($Cnt_1$; $Cnt_2$), wherein the counter associated with the active clock source get its variable ($Cnt_1$; $Cnt_2$) initialized to a constant value ($Nfail_1$, $Nfail_2$) when the input signal (Select) indicates the switching off of the active clock source Clk_A; Clk_B. In this instance the finite state machine $12_1$;$12_2$ associated with the active clock source Clk_A;Clk_B enters a CHECK state, wherein the counter $14_1$, $14_2$ decrements the variable ($Cnt_1$; $Cnt_2$) at each clock cycle. If the other finite state machine $12_2$, $12_1$ verifies the presence of its clock source Clk_B;Clk_A before the respective variable ($Cnt_1$; $Cnt_2$) reach zero, the switch of the active clock source will be effected, Clk_B;Clk_A. If, on the other hand, the variable ($Cnt_1$; $Cnt_2$) decrements to zero, then the other clock source is unavailable and no switch of the active clock source will be effected Clk_A;Clk_B.

In the above example, the counter begins at a count variable and decrements toward zero, however, it should be understood that the present invention contemplates any counting from a first predetermined value to a second predetermined value, either incrementing or decrementing, and any such count functionality is contemplated as falling within the scope of the invention.

Figure 4:
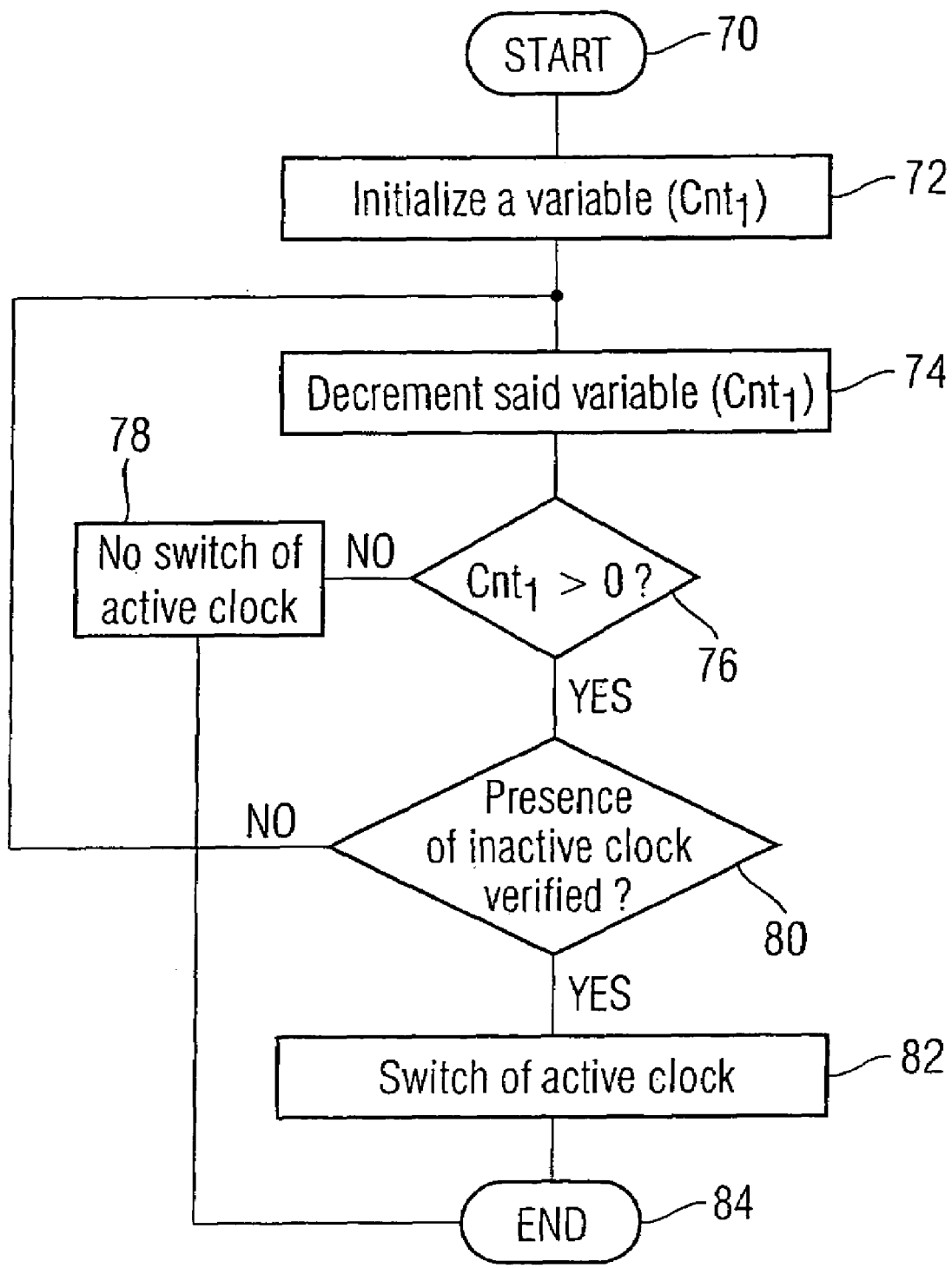
FIG. 4 is a flow chart of a method for deadlock-free switching of the source of the digital clock for an integrated circuit according to another embodiment of the invention.

In FIG. 4 there is disclosed a flow chart of a method for deadlock-free switching of the source of the digital clock for an integrated circuit according to one embodiment of the invention. The method is performed with the aid of a first and a second clock source Clk_A,Clk_B, wherein the first clock source Clk_A is active, and the second clock source Clk_B is inactive in this example. The method begins at 70. The method continues at 72 with an initialization of a variable ($Cnt_1$) to a constant value ($Nfail_1$) when the switching off of the active clock source Clk_A is indicated. Thereafter, at 74, the method continues with decrementing the variable count ($Cnt_1$) at each clock cycle. The method continues at 76 with the query whether the variable ($Cnt_1$) is greater than zero. If the answer is negative at 76, the method continues at 78 where no switch of the active clock source will be effected, i.e. Clk_A will remain active. If, on the other hand the answer to the query at 76 is affirmative, the method continues at 80 with another query whether the presence of the inactive clock source Clk_B is verified. If the answer at 80 is negative, the method continues by returning to 74. If, on the other hand, the answer to the query at 80 is affirmative, the method continues at 82, and the active clock source is switched, i.e. the clock source Clk_B will be active. The method is completed at 84.

Figure 5:
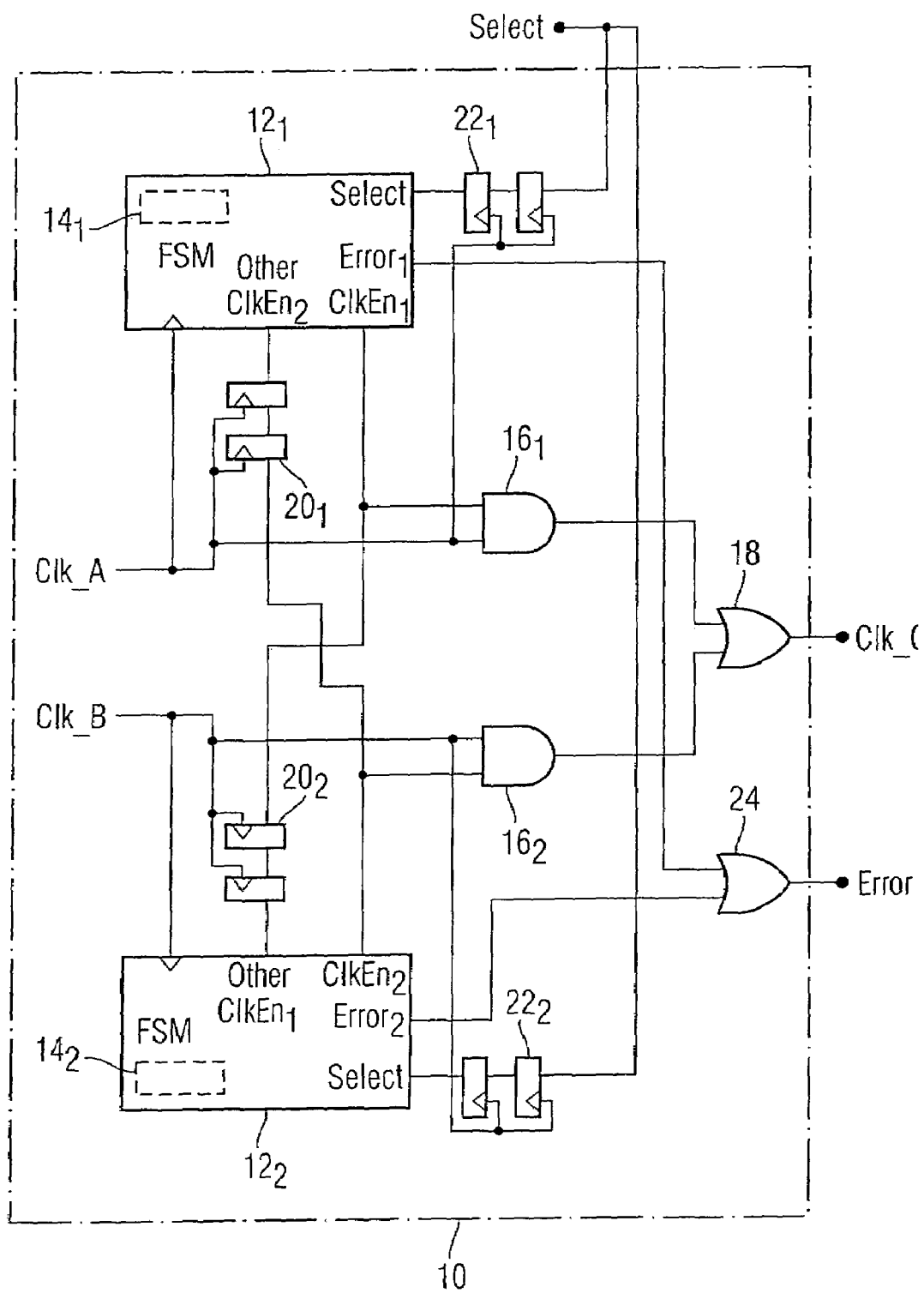
FIG. 5 is a block diagram of another embodiment of a digital clock switching means 10 according to the invention.

In FIG. 5 there is disclosed a block diagram of another embodiment of a digital clock switching circuit 10 according to the invention. The digital clock switching circuit 10 is operable to deadlock-free switch the source of the digital clock for an integrated circuit. The digital clock switching circuit 10 comprises a first finite state machine $12_1$ connected to a first clock source Clk_A, and a second finite state machine $12_2$ connected to a second clock source Clk_B. The finite state machines $12_1$, $12_2$ are connected to each other, via the signals $ClkEn_1$, $ClkEn_2$, Other $ClkEn_1$, Other $ClkEn_2$, in order to monitor the current state of the other finite state machine $12_1$; $12_2$. Each finite state machine $12_1$, $12_2$ has an input signal (Select) operable to control which clock source Clk_A; Clk_B that should be active and passed to a clock output Clk_Out of the digital clock switching circuit 10. Each finite state machine $12_1$, $12_2$ comprises a counter $14_1$, $14_2$ with a variable count ($Cnt_1$; $Cnt_2$), wherein the counter associated with the active clock source get its variable ($Cnt_1$; $Cnt_2$) initialized to a constant value ($Nfail_1$, $Nfail_2$) when the input signal (Select) indicates the switching off of the active clock source Clk_A; Clk_B. In this instance the finite state machine $12_1$; $12_2$ connected to the active clock source Clk_A; Clk_B enters a CHECK state, wherein the respective counter $14_1$; $14_2$ decrements the associated variable ($Cnt_1$; $Cnt_2$) at each clock cycle. If the other finite state machine $12_1$; $12_2$ verifies the presence of its clock source Clk_B; Clk_A before the variable ($Cnt_1$; $Cnt_2$) reaches zero, the switch of the active clock source will be effected, Clk_B; Clk_A. If, on the other hand, the variable ($Cnt_1$; $Cnt_2$) decrements to zero, no switch of the active clock source will be effected Clk_A; Clk_B. The digital clock switching circuit 10 also comprises two AND-gates $16_1$, $16_2$, wherein each AND-gate $16_1$, $16_2$ has a first input receiving a clock enable signal, $Clk\_En_1$; $Clk\_En_2$, and a second input receiving the clock source Clk_A; Clk_B. The digital clock switching circuit 10 also comprises a first OR-gate 18 connected to each AND-gate $16_1$, $16_2$, and outputting the clock output Clk_Out.

As is apparent from FIG. 5, the digital clock switching circuit 10 also comprises two first double latch synchronizers $20_1$, $20_2$, each of which is connected to the respective finite state machines $12_1$, $12_2$. Each finite state machine $12_1$; $12_2$ is connected to a second double latch synchronizer $22_1$; $22_2$, whereby the input signal (Select) passes to the respective state machine via the second double latch synchronizer $22_1$; $22_2$. As is apparent from FIG. 5, the first clock source Clk_A is connected to, and controls the first and second double latch synchronizers $20_1$, $22_1$ connected to the first finite state machine $12_1$. The second clock source Clk_B is connected to, and controls the first and second double latch synchronizers $20_2$, $22_2$ connected to the second finite state machine $12_2$. The digital clock switching circuit 10 also comprises a second OR-gate 24 connected to an Error output $Error_1$, $Error_2$ of each finite state machine $12_1$, $12_2$. The second OR-gate 24 has an output Error.

Figure 6:
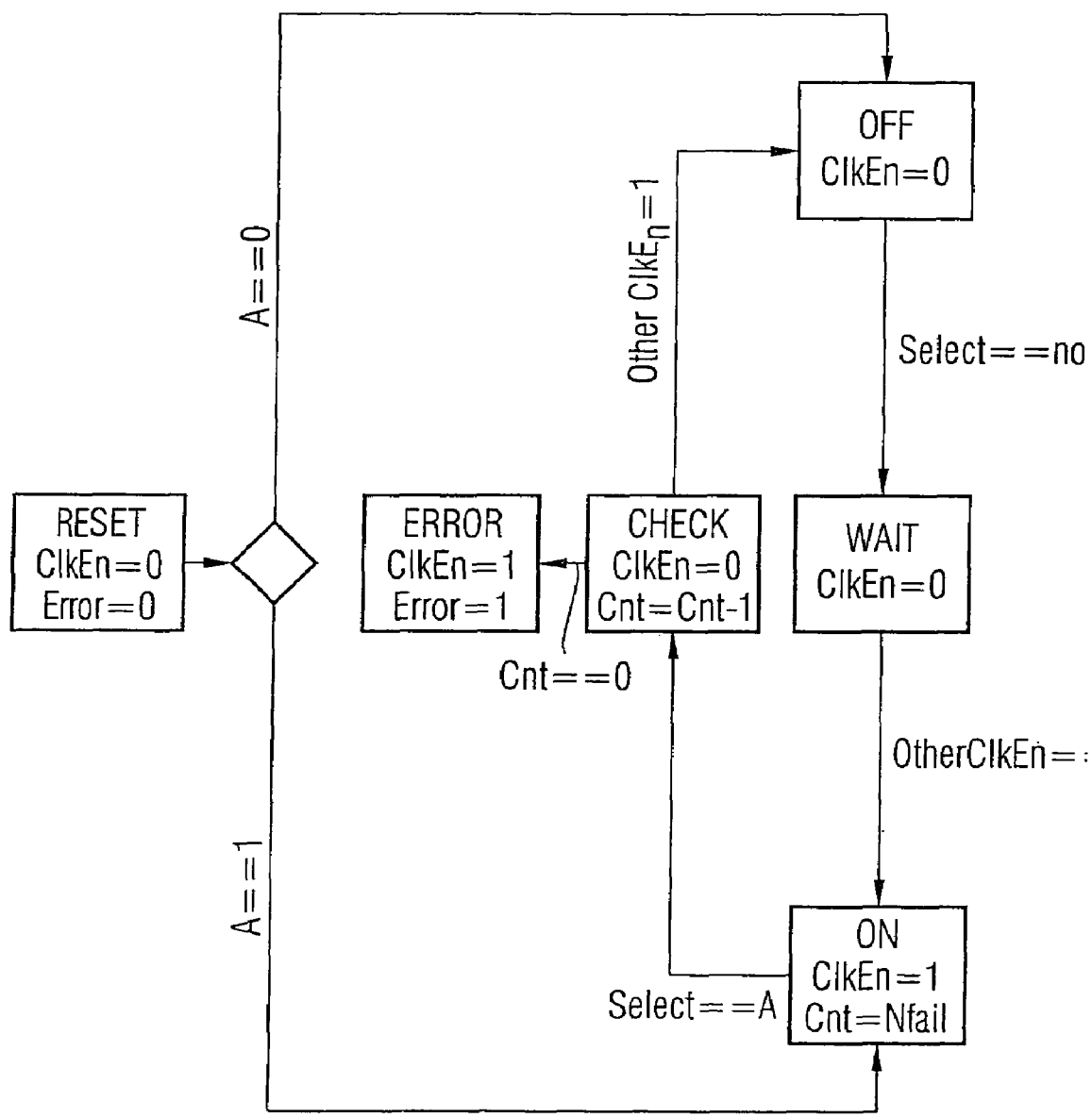
FIG. 6 is a state diagram for the finite state machines $12_1$, $12_2$ comprised in the digital clock switching circuit disclosed in FIG. 5.

In FIG. 6 there is disclosed a state diagram for the finite state machines $12_1$, $12_2$ comprised in the digital clock switching circuit 10 disclosed in FIG. 5.

In order to avoid a deadlock situation, the invention verifies that the clock to be selected is present, and for the system clock to continue in the event that the clock to be selected is not present.

One difference between the conventional clock-switch circuit is in the behaviour of the FSM $12_1$, $12_2$ when switching the associated clock off (transition from state ON to state OFF). According to one embodiment of the invention, the FSM $12_1$, $12_2$ must first pass through the state CHECK. Prior to entering the CHECK state, a variable count ($Cnt_1$; $Cnt_2$) is initialized to a constant value ($Nfail_1$, $Nfail_2$). While in the CHECK state, the counter $14_1$; $14_2$ is decremented at each clock cycle. If it is observed that the other FSM has responded to the clock switch and enabled its clock prior to the count reaching zero (or some other predetermined value), it is safe to proceed to the OFF state. If the other FSM does not respond in a timely fashion, the counter $14_1$; $14_2$ will decrement to zero. In this case, it is assumed that the other clock is not present and the FSM enters the ERROR state, re-enables the output clock and asserts an error indication. The constant value ($Nfail_1$; $Nfail_2$) should be set, in one example, to a value such that the counter $14_1$; $14_2$ will not expire in the event that the other clock is present.

This circuit is primarily intended for applications when a clock is either present or not present, and in applications where the clock initially is not present and then subsequently starts (since this could cause the situation where one FSM $12_1$; $12_2$ enters the error state and passes its clock to the output at the same time as the other FSM $12_2$; $12_1$ enters the ON state).

Figure 7:
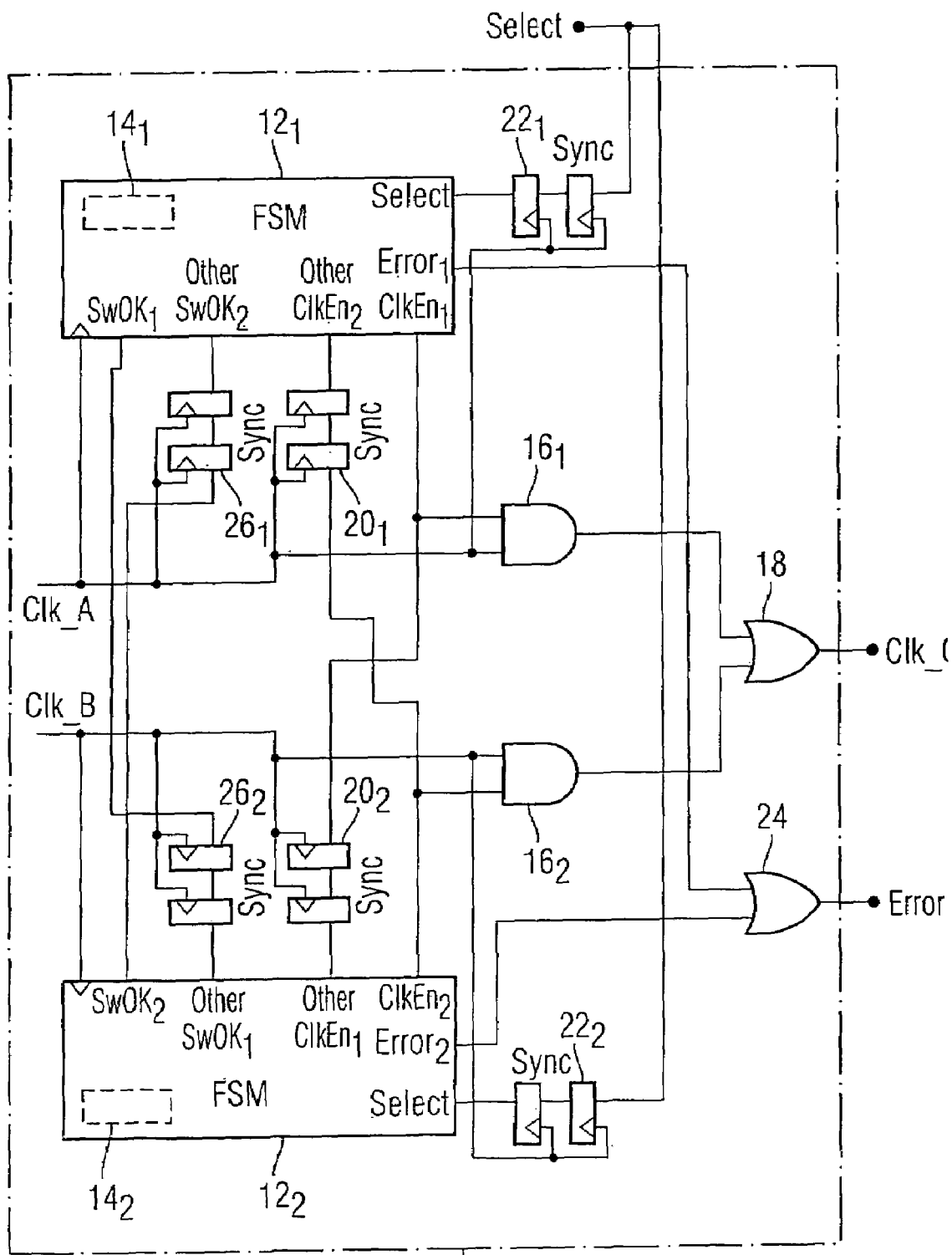
FIG. 7 is a block diagram of yet another embodiment of a digital clock switching means 10 according to the invention.

In FIG. 7 there is disclosed a block diagram of another embodiment of a digital clock switching circuit 10 according to the invention. The similar components in FIG. 7 as in FIG. 5 has been designated with the same reference numbers and will not be described in detail again. One difference between the FIGS. 7 and 5, is that in FIG. 7, each finite state machine $12_1$, $12_2$ also comprises an output $SwOK_1$; $SwOK_2$, and an output Other $SwOK_1$; Other $SwOK_2$, and the output $SwOK_2$; $SwOK_1$ of each finite state machine $12_1$, $12_2$ is connected, via a third double latch synchronizer $26_1$; $26_2$ to the input Other $SwOK_2$; OtherSwOK$_1$ of the other finite state machine $12_1$, $12_2$. The function of the digital clock switching circuit 10 disclosed in FIG. 7 will be described in conjunction with FIG. 8.

Figure 8:
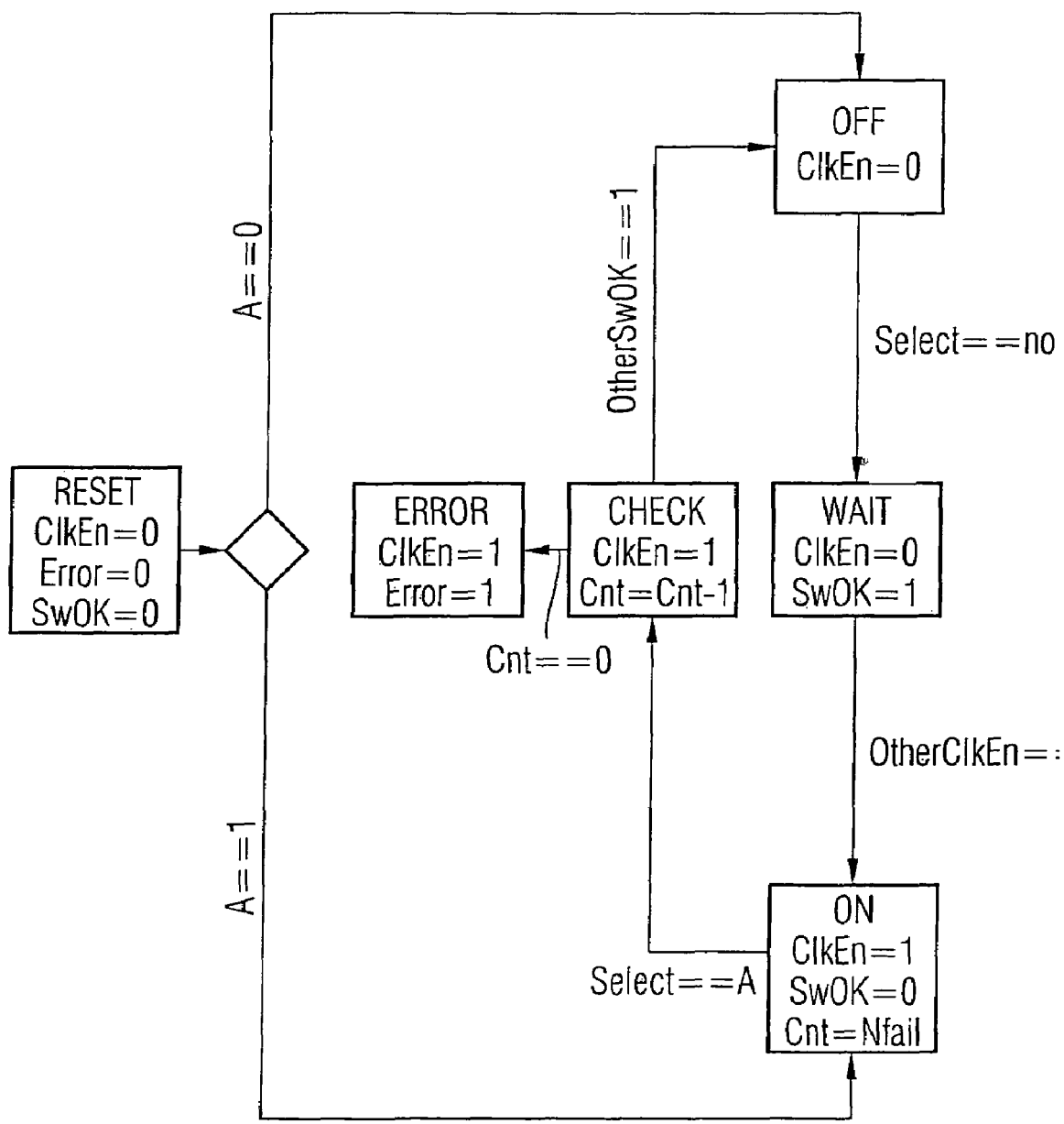
FIG. 8 is a state diagram for the finite state machines $12_1$, $12_2$ comprised in the digital clock switching circuit 10 disclosed in FIG. 7.

In FIG. 8 there is disclosed a state diagram for the finite state machines $12_1$, $12_2$ comprised in the digital clock switching circuit 10 disclosed in FIG. 7 according to one example.

An alternative implementation of the method could first verify the presence of the other clock, and only then proceed to disable its own clock. Such a circuit would be more complex, since it would require an additional output and input from each FSM $12_1$; $12_2$, with two synchronisers in each path. The additional output SwOK is used to indicate that the state machine $12_2$; $12_1$ has observed the request to switch on its clock and is prepared to do so.

When an FSM $12_1$; $12_2$ is in state 'On' (clock enable active), and observes a request to switch off its clock, it first proceeds to the state 'Check' to see that the other FSM $12_2$; $12_1$ asserts SwOK. If this does not appear within the allocated time, the error state is entered. Otherwise, on seeing SwOK==1, the FSM $12_1$; $12_2$ shuts off its own clock output enable signal.

When an FSM $12_1$; $12_2$ is in state 'Off' (clock enable inactive), and observes a request to switch on its clock, it first proceeds to the state 'Wait'. Here, it asserts SwOK to indicate that it is capable of switching on its clock. As soon as the other FSM $12_2$; $12_1$ has responded and switched off its clock, the local clock enable can be asserted.

In FIG. 9 there is disclosed a schematic diagram of some computer program products for deadlock-free switching of the source of the digital clock for an integrated circuit according to the present invention. There is disclosed n different digital computers $100_1, \ldots, 100_n$, wherein n is an integer.

There is also disclosed n different computer program products $102_1, \ldots, 102_n$, here showed in the form of compact discs. The different computer program products $102_1, \ldots, 102_n$ are directly loadable into the internal memory of the n different digital computers $100_1, \ldots, 100_n$. Each computer program product $102_1, \ldots, 102_n$ comprises software code portions for performing some or all the steps of FIG. 4 when the product(s) $102_1, \ldots, 102_n$ is/are run on said computer(s) $100_1, \ldots, 100_n$. Said computer program products $102_1, \ldots, 102_n$ can e.g. be in the form of floppy disks, RAM disks, magnetic tapes, opto-magnetic disks or any other suitable products.

The invention is not limited to the embodiments described in the foregoing. It will be obvious that many different modifications are possible within the scope of the following claims.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A digital clock switching circuit operable to deadlock-free switch the source of the digital clock for an integrated circuit, comprising:
   a first finite state machine associated with a first clock source;
   a second finite state machine associated with a second clock source, wherein the first and second finite state machines are connected to each other and configured to monitor a current state of the other finite state machine, and wherein each finite state machine comprises an input configured to receive an input select signal that is configured to control which of the first and second clock sources should be active and passed to a clock output of the digital clock switching circuit, and wherein each of the first and second finite state machines comprises a counter with a variable associated therewith, wherein the counter of the finite state machine associated with the active clock source at an instant in time is configured to initialize the variable of its respective counter to a first predetermined value when the input select signal indicates a switching off of the active clock source, and wherein the finite state machine associated with the active clock source is configured to enter a CHECK state in response thereto, wherein the respective counter increments or decrements the variable at each clock cycle, and if the other finite state machine verifies a presence of its clock source before the variable reaches a second predetermined value, the switch of the active clock source is effected, and if the variable reaches the second predetermined value, no switch of the active clock source is effected.

2. The digital clock switching circuit of claim 1, wherein each finite state machine comprises an output and an output clock enable signal, wherein each output clock enable signal comprises a first input to a respective AND-gate, and wherein each AND-gate comprises a second input configured to receive one of the first and second clock sources, respectively, and wherein the digital clock switching circuit also comprises a first OR-gate having inputs connected to the output of each AND-gate and configured to output one of the first and second clock sources at the clock output of the digital clock switching circuit.

3. The digital clock switching circuit of claim 2, wherein the output associated with the clock enable signal of each finite state machine is connected, via a first double latch synchronizer, to an input of the other finite state machine, wherein each finite state machine is configured to monitor a state of the other clock enable signal based on the respective clock enable signal at the input.

4. The digital clock switching circuit of claim 3, wherein each finite state machine is connected to a second double latch synchronizer, and wherein the input select signal is received at each finite state machine via the respective second double latch synchronizer.

5. The digital clock switching circuit of claim 4, wherein the first clock source is connected to and controls the first and second double latch synchronizers connected to the first finite state machine, and wherein the second clock source is connected to and controls the first and second double latch synchronizers connected to the second finite state machine.

6. The digital clock switching circuit of claim 1, wherein the respective finite state machine associated with the active clock source is configured to disable the active clock source before the other finite state machine verifies a presence of its clock source.

7. The digital clock switching circuit of claim 1, wherein the finite state machine associated with the inactive clock source is configured to verify a presence of its respective clock source before the other finite state machine disables the active clock source.

8. The digital clock switching circuit of claim 2, wherein the digital clock switching circuit further comprises a second OR-gate configured to receive an error output signal from each finite state machine.

9. The digital clock switching circuit of claim 8, wherein if the counter associated with the finite state machine associated with the active clock source has varied the variable to the second predetermined value, the finite state machine currently in the CHECK state is configured to enter an ERROR state, wherein the finite state machine is configured to re-enable the active clock source for passage to the clock output, and issue an error signal to the second OR-gate.

10. The digital clock switching circuit of claim 7, wherein each finite state machine also comprises another output and another input, wherein the another output of each finite state machine is connected, via a third double latch synchronizer, to the another input of the other finite state machine.

11. The digital clock switching circuit of claim 10, wherein the first clock source is connected to, and is operable to control the third double latch synchronizer connected to the first finite state machine, and wherein the second clock source is connected to, and is operable to control the third double latch synchronizer connected to the second finite state machine.

12. The digital clock switching circuit of claim 11, wherein if the finite state machine associated with the active clock source has its clock enable signal active, and the input select signal indicates a switching off of the active clock source, the finite state machine is operable to enter a CHECK state, wherein the active clock source is disabled if the other finite state machine has its another output active before the counter of the finite state machine associated with the active clock source has reached the second predetermined value, and if the other finite state machine does not have its another output active before the counter has reached the second predetermined value, the finite state machine associated with the active clock source is operable to enter the ERROR state and issue the error signal to the second OR-gate.

13. The digital clock switching circuit of claim 11, wherein if the finite state machine not associated with the active clock source has its clock enable signal inactive, and the input select signal indicates a switching on of its respective clock source, the finite state machine is configured to enter a WAIT state and its another output is operable to become active, and when the other finite state machine has switched off its respective clock source, the other clock source is operable to be active and passed to the clock output.

14. A method for deadlock-free switching of a digital clock source for an integrated circuit, with the aid of a first and a second clock source, wherein the first clock source is active, and the second clock source is inactive, comprising:
initializing a variable to a first predetermined value when a switching off of the active clock source is indicated;
incrementing or decrementing the variable at each clock cycle;
switching the active clock source from the first clock source to the second clock source if the presence of the inactive clock source is verified before the variable reaches a second predetermined value; and
preventing switching of the active clock source if the variable reaches the second predetermined value.

15. The method of claim 14, further comprising disabling the active clock source before a presence of the other clock source is verified.

16. The method of claim 14, further comprising verifying a presence of the inactive clock source before disabling the active clock source.

17. The method of claim 14, further comprising:
enabling the active clock source if the variable reaches the second predetermined value; and
issuing an error indication.

18. The method of claim 14, wherein the method is performed with the aid of a digital clock switching circuit comprising a first finite state machine associated with the first clock source, and a second finite state machine associated with the second clock source, wherein each finite state machine receives an input select signal operable to control which clock source should be active and passed to a clock output of the digital clock switching circuit, wherein each finite state machine further comprises a counter, and wherein the method further comprises entering a CHECK state with the finite state machine associated with the active clock source when the input select signal indicates a switching off of the active clock source.

19. The method of claim 18, wherein each finite state machine comprises a clock enable signal output connected, via a first double latch synchronizer, to an input of the other finite state machine, the method further monitoring a state of each finite state machine with the clock enable signal from the other finite state machine, respectively.

20. The method of claim 19, wherein each finite state machine also comprises another output and another input, the method further comprising:
entering a CHECK state with the finite state machine associated with the active clock source if the respective finite state machine has its clock enable signal active, and the input select signal indicates a switching off of the active clock source;
disabling the active clock source if the other finite state machine has its another output active before the counter has reached the second predetermined value;
entering an ERROR state with the finite state machine associated with the active clock source if the other finite state machine does not have its another output active before the counter reaches the second predetermined value; and
issuing an error signal.

21. The method of claim 19, further comprising:
entering a WAIT state with the finite state machine associated with the active clock source if the respective finite state machine has its clock enable signal inactive, and the input select signal indicates a switching on of the active clock source; and
activating the other clock source and passing it to the clock output when the other finite state machine has switched off its clock source to activate the other clock source.

* * * * *